US008638666B2

(12) United States Patent
Dorau et al.

(10) Patent No.: US 8,638,666 B2
(45) Date of Patent: Jan. 28, 2014

(54) METHOD FOR OPERATING A MULTIPORT MAC BRIDGE HAVING PORTS WHICH CAN BE SWITCHED OFF ACCORDING TO AN ISOCHRONOUS DATA STREAM AT ONE PORT OR PORT PAIR IN ETHERNET LANS

(75) Inventors: Kai Dorau, Hannover (DE); Stefan Kubsch, Hohnhorst (DE)

(73) Assignee: Thomson Licensing (FR)

( * ) Notice: Subject to any disclaimer, the term of this patent is extended or adjusted under 35 U.S.C. 154(b) by 175 days.

(21) Appl. No.: 12/998,373

(22) PCT Filed: Oct. 13, 2009

(86) PCT No.: PCT/EP2009/063333
§ 371 (c)(1),
(2), (4) Date: Jun. 28, 2011

(87) PCT Pub. No.: WO2010/043610
PCT Pub. Date: Apr. 22, 2010

(65) Prior Publication Data
US 2011/0255405 A1    Oct. 20, 2011

(30) Foreign Application Priority Data

Oct. 16, 2008 (DE) .......................... 10 2008 051 861

(51) Int. Cl.
*G01R 31/08* (2006.01)
*H04L 12/50* (2006.01)
(52) U.S. Cl.
USPC ............................ 370/235; 370/217; 370/357
(58) Field of Classification Search
USPC ................... 370/217, 225, 235, 357
See application file for complete search history.

(56) References Cited

U.S. PATENT DOCUMENTS 5,404,537 A * 4/1995 Olnowich et al. ............. 370/388
6,535,489 B1 3/2003 Merchant et al.
(Continued)

FOREIGN PATENT DOCUMENTS

| EP | 0603444 | 6/1994 |
|---|---|---|
| JP | 2003318971 | 11/2003 |
| WO | WO2005079016 | 8/2005 |

OTHER PUBLICATIONS

IEEE Standards: "Media Access Control (MAC) Bridges", 802.1D, IEEE Computer Society, 2004.

(Continued)

*Primary Examiner* — Derrick Ferris
*Assistant Examiner* — Joe Combs
(74) *Attorney, Agent, or Firm* — Jack Schwartz & Associates, PLLC

(57) ABSTRACT

In the method for operating a multi-port bridge for the routing, differentiated in accordance with traffic classes, of data packets which are subdivided into different priority classes in accordance with the IEEE802.1D standard, an additional traffic class "isochronous channel" is introduced. The multi-port bridge is configured in such a manner that at least one predetermined port in the case of unidirectional transmission and at least one predetermined port pair in the case of bidirectional transmission is operated in the "forwarding" state in which the predetermined port or the predetermined port pair forwards data packets of the additional traffic class IC from a queue. During the forwarding, all ports are deactivated with the exception of the predetermined port or port pair. The isochronous data stream is not restricted to one port or port pair but can be executed several times in dependence on the data rate of the transmission channel.

3 Claims, 4 Drawing Sheets

(56) References Cited

U.S. PATENT DOCUMENTS

| | | |
|---|---|---|
| 6,691,198 B1 | 2/2004 | Hamlin |
| 6,731,638 B1 | 5/2004 | Ofek |
| 7,352,706 B2 | 4/2008 | Klotz et al. |
| 2001/0037422 A1* | 11/2001 | Thaler et al. ............. 710/126 |
| 2002/0159398 A1* | 10/2002 | Yamada et al. ............ 370/256 |
| 2002/0181413 A1* | 12/2002 | Kitagawa ................. 370/256 |
| 2003/0204653 A1 | 10/2003 | Katayama |
| 2004/0019714 A1* | 1/2004 | Kelley et al. .............. 710/52 |
| 2004/0073721 A1* | 4/2004 | Goff et al. ................. 710/22 |
| 2005/0207412 A1 | 9/2005 | Kawashima et al. |
| 2006/0083232 A1* | 4/2006 | Jin ....................... 370/389 |
| 2006/0153228 A1* | 7/2006 | Stahl et al. ............... 370/466 |
| 2006/0268903 A1* | 11/2006 | Feng ..................... 370/401 |
| 2007/0014279 A1 | 1/2007 | Wang et al. |
| 2007/0076635 A1* | 4/2007 | Tallet .................... 370/255 |
| 2007/0171914 A1* | 7/2007 | Kadambi et al. .......... 370/395.2 |
| 2007/0263554 A1* | 11/2007 | Finn ..................... 370/256 |
| 2008/0028120 A1* | 1/2008 | McLeod .................. 710/313 |
| 2008/0089321 A1* | 4/2008 | Arulappan et al. ......... 370/386 |
| 2008/0159304 A1* | 7/2008 | Ozugur et al. ............ 370/401 |
| 2008/0175265 A1* | 7/2008 | Yonge et al. ............. 370/447 |
| 2009/0034518 A1* | 2/2009 | Diab ..................... 370/389 |
| 2010/0135309 A1* | 6/2010 | Hetzel et al. ............. 370/401 |
| 2010/0284417 A1* | 11/2010 | Gurdan et al. ............ 370/401 |

OTHER PUBLICATIONS

Int'l Search Report Dated Dec. 30, 2009 and German Search Report Dated Jun. 24, 2009.

* cited by examiner

|  | | Traffic types | | | | | | |
|---|---|---|---|---|---|---|---|---|
| Number of queues | 1 | BE, IC (EE, BK, VO, CL, VI, NC) | | | | | | |
| | 2 | BE (EE, BK) | | | VO (CL, VI, NC) | | | |
| | 3 | BE (EE, BK) | | | CL (VI) | | VO (NC) | |
| | 4 | BK | BE (EE) | | CL (VI) | | VO (NC) | |
| | 5 | BK | BE (EE) | | CL | VI | VO (NC) | |
| | 6 | BK | BE | EE | CL | VI | VO (NC) | |
| | 7 | BK | BE | EE | CL | VI | VO | NC |
| | 8 | BK | - | BE | EE | CL | VI | VO | NC |
| | | 1 | 2 | 0 | 3 | 4 | 5 | 6 | 7 |
| | | User priorities | | | | | | | |

Fig. 4

METHOD FOR OPERATING A MULTIPORT MAC BRIDGE HAVING PORTS WHICH CAN BE SWITCHED OFF ACCORDING TO AN ISOCHRONOUS DATA STREAM AT ONE PORT OR PORT PAIR IN ETHERNET LANS

This application claims the benefit, under 35 U.S.C. §365 of International Application PCT/EP2009/063333, filed Oct. 13, 2009, which was published in accordance with PCT Article 21(2) on Apr. 22, 2010 in German and which claims the benefit of German patent application No. 10 2008 051 861.1, filed Oct. 16, 2008.

The invention relates to a method for operating a multi-port bridge according to the precharacterizing clause of Claim 1.

PRIOR ART

US 2005/0265330 A1 discloses a network relay system which performs a data transmission to and from an opposite device.

The network relay system comprises a number of ports which are connected to corresponding ports of an opposite facility. The network relay system also comprises a connection aggregation control module which aggregates the connections in order to set up a connection aggregation which is considered to be a logical connection and performs a transmission of a control frame signal comprising a synchronization bit and a data transmission to each port via the connection aggregation. As a response to the detection of the occurrence of interference in one of the aggregated connections, the connection aggregation control module causes a port connected to a normal interference-free connection to stop the data transmission and to send the control frame signal which comprises the synchronization bit set to a first value. The first value is used for stopping the data transmission at a corresponding port of the opposite device which is connected to the normal connection.

From U.S. Pat. No. 7,065,050 B1, a method and a device for controlling the data flow in a network switching facility is known. The method comprises the steps of determining whether a set of data arranged in a queue for a port exceed a first predetermined threshold value and the deactivation of the data flow to the port if it is determined that the set of data arranged in the queue have exceeded the first threshold value and the reactivation of the data flow to the port if a predetermined spatial condition and a predetermined temporal condition have been met. The device comprises at least one queue in connection with at least one data port interface for the reception of data which are transmitted to at least one data port interface and a memory management unit in connection with at least one queue. The memory management unit is designed in such a manner that it deactivates the data flow when a filling level of the data in the queue reaches a predetermined threshold value and thereafter reactivates the data flow to the queue when the filling level of the data in the queue reaches a second predetermined threshold value and a predetermined time has elapsed.

WO 2004/068798 A2 describes a method of prioritizing an isochronous data stream which is transmitted from a first bus of a first type of construction having a first bandwidth to a second bus by using a medium having a second bandwidth which is narrower than the first bandwidth.

It is also known to use multi-port bridges in order to divide networks into different layer-1 segments. The associated load in the entire network is considerably reduced since each segment only transports the frames whose receivers are also located in this segment. For real-time applications which demand a guaranteed data rate, prioritization capabilities (traffic classes or traffic types) have been created and listed in the IEEE802.1D standard (Institute of Electrical and Electronic Engineers). In practice, the traditional division of the data streams into different priority classes is not sufficient for guaranteeing the higher demands made on the data throughput.

INVENTION

The object of the present invention then consists in improving the real-time-capability of a data stream in comparison with the prior art and minimizing the propagation delay and the output jitter with respect to the input.

This object is achieved by a method having the features of Claim 1. Advantageous embodiments of the invention are defined in further claims.

In the method for operating a multi-port bridge for routing differentiated in accordance with traffic classes (meaning, in other words, that the traffic class or information about the traffic class, respectively, are taken into consideration during the routing) of data packets, an additional traffic class is introduced. In one embodiment of the invention, the data packets are subdivided into different priority classes in accordance with the IEEE802.1D standard and an additional traffic class is defined. The multi-port bridge is configured in such a manner that, for each transmission direction, at least one predetermined port is operated in the "forwarding" state and, if necessary, is set into the "forwarding" state in which the predetermined port exclusively forwards data packets of the additional traffic class from a queue. If these are bidirectional data connections, a port pair is set into or operated in the "forwarding" state. In this context, all ports apart from the predetermined port or the predetermined port pair are deactivated during the forwarding.

In one embodiment of the method according to the invention, the method comprises a first checking step in which it is checked whether the additional traffic class is assigned to the arriving traffic. The method is continued in the case of a positive result of the first checking step in a second checking step in which it is checked whether an isochronous data flow is currently active. The method is continued in accordance with the IEEE802.1D standard in the case of a negative result of the first checking step.

According to one embodiment of the method according to the invention, the method, is continued in the case of a positive result of the second checking step in a triggering step in which a watchdog circuit is triggered which, in operation, is used for informing a control unit about a currently active isochronous data stream. The control unit regulates the transmission of the traffic stream in the additional traffic class. In the case of a negative result of the second checking step, in contrast, a subprocess comes into operation which comprises at least one of the following steps:

a first deactivation step in which all ports are switched off, with the exception of the predetermined port or port pair. Thus, only the input and output port of the isochronous data channel is active and, as a result, guarantees the fastest possible transportation without further queue management;

a saving step in which the data packets of the queues allocated to the deactivated ports are saved until the respective ports are switched on again;

a second deactivation step in which the spanning tree mechanism for the predetermined port or the predetermined port pair is deactivated. In the saving step, all queues of the ports already deactivated are stopped which prevents loss of data when the queues are reactivated again later (the content of the queues is not deleted);

an installation step in which a watchdog circuit is installed, the value of which for the timeout time is selected to be of such magnitude that this watchdog circuit can be woken up at any time during the forwarding of the isochronous data stream in the additional traffic class.

The invention has numerous advantages, some of which will be listed in the text which follows:

The queue delay resulting from managing different queues of a number of ports is avoided.

Disturbances of the isochronous data stream are avoided because there are no prioritization mechanisms of other competing ports. This prevents the risk of interrupting the real-time data flow.

The spanning tree mechanisms responsible for avoiding redundant traffic paths via a number of multi-port bridges are bypassed, as it were. This eliminates control frames and the periodic readjustment in the network.

The present invention is not restricted to a predetermined port or predetermined port pair for an isochronous data stream of the new traffic class IC. It is possible to define a number of ports or port pairs for isochronous data transport depending on the data rate specifications of the transmission channel.

BRIEF DESCRIPTION OF THE DRAWINGS

FIG. 4 shows a table which shows the relationship between traffic types, the number of queues, and the user priorities with respect to one another.

EMBODIMENTS OF THE INVENTION TO BE CONSIDERED AS ILLUSTRATIVE

Figure 1:
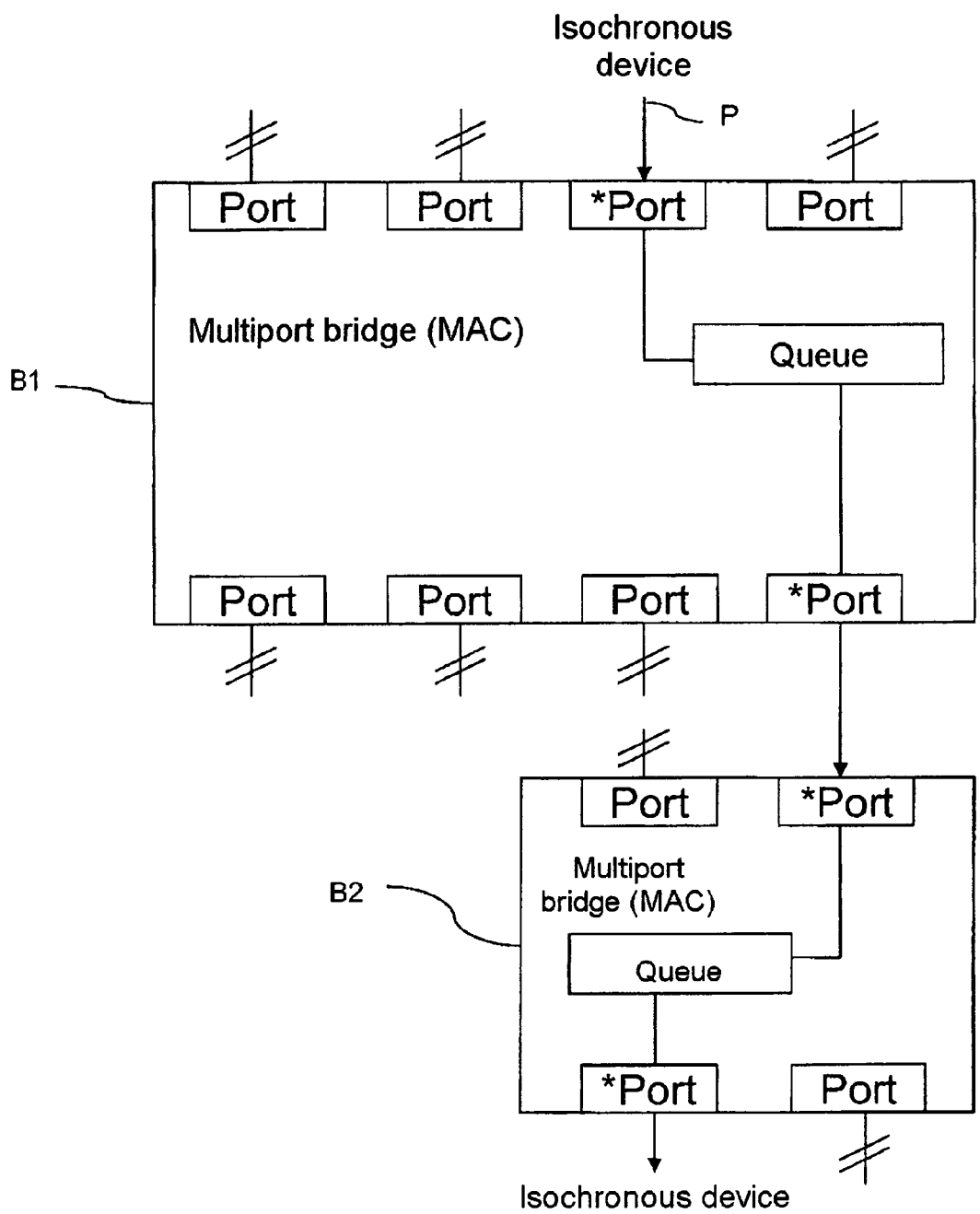
FIG. 1 shows a diagrammatic system chart for illustrating an isochronous data flow over two multi-port bridges.

FIG. 1 shows a diagrammatic system chart for illustrating an isochronous data flow over two multi-port bridges B1, B2. The path P of the isochronous data flow leads through a first multi-port bridge B1 for the routing, differentiated in accordance with traffic classes, of data packets, and a second multi-port bridge B2 for the routing, differentiated in accordance with traffic classes, of data packets. A first port pair of each multi-port bridge B1, B2, to which an additional traffic class IC (isochronous channel), newly introduced according to the invention, is statically assigned, can exclusively access the resources (queue). All other ports of the multi-port bridge are switched off. These disconnected ports exhibit the "disabled" status and are accordingly not managed by the bridge management. The queues of the disconnected ports are "frozen" so that the data are not lost after reactivating the respective ports within the queues. Spanning tree mechanisms do not come into operation at the first port pair since the path is exclusively used only by the isochronous data stream.

Figure 2:
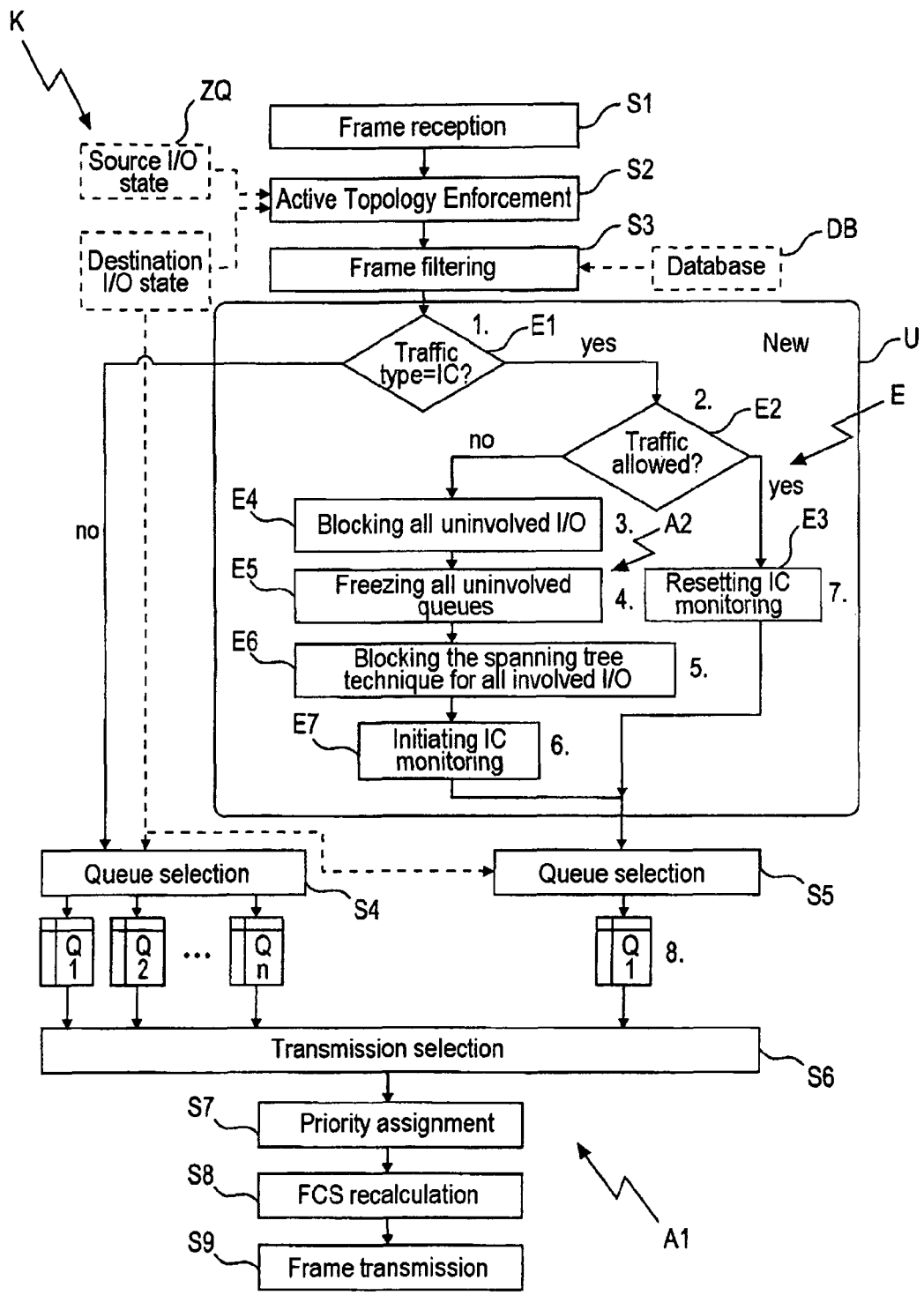
FIG. 2 shows a flowchart of the sequence of the method according to the invention.

FIG. 2 shows a flowchart for the sequence of the method according to the invention. The traditional part of the flowchart located outside a rectangular border U is previously known from the IEEE802.1D standard. The traditional part K of the flowchart comprises a frame reception step S1 in which frames are received, an active topology execution step S2 following the frame reception step S1, in which information about the source port state ZQ and information about the destination port state ZZ are taken into consideration. The topology execution step S2 is followed by a frame filtering step S3 which resorts to a filter database.

The traditional part K of the flowchart also comprises a first insertion step S4 and a second insertion step S5 in which in each case frames are inserted into queues.

The traditional part K of the flowchart finally comprises a first branch A1 with the steps, following one another in time, of transmission selection S6, priority allocation S7, FCS (frame check sequence) recalculation S8 and frame transmission S9.

The innovative part of the flowchart located within the border U, provided with the reference symbol E overall, is related to a novel procedure as provided by the invention. The innovative part E of the flowchart firstly comprises a checking step E1 in which it is checked whether the additional traffic class IC is assigned to the arriving traffic.

In case of a negative result of the first checking step E1, the method is continued in the first insertion step S4 in accordance with the IEEE802.1D standard. In the case of a positive result of the first checking step E1, the method is continued in a second checking step E2 in which it is checked whether an isochronous data stream is currently active.

In the case of a positive result of the second checking step E2, the method is continued in a triggering step E3 in which a watchdog circuit is triggered which, in operation, is used for informing a control unit that a data stream is currently active. This control unit regulates the transmission of the traffic stream in the additional traffic class.

In the case of a negative result of the second checking step E2, a second branch of the flowchart comes into action which comprises the steps mentioned hereinafter, following one another in time:

a first deactivation step E4 in which all ports are switched off with the exception of the predetermined port or port pair;

a saving step E5 in which the data packets of the queues allocated to the deactivated ports are saved until the respective ports are switched on again;

a second deactivation step E6 in which the spanning tree mechanism for the selected port pair is deactivated;

an installation step E7 in which a watchdog circuit is installed, the value of which for the timeout time is selected to be of such magnitude that this watchdog circuit can be woken up (watchdog triggering) at any time during the flowing of the isochronous data stream.

Both the installation step E7 and the triggering step E3 are followed by the first insertion step S4 located within the traditional part K of the flowchart. An isochronous data stream only requires one queue which is ideally managed in accordance with the FIFO (first in first out) principle. This eliminates the queue management of other queues during the transmission of the isochronous data stream.

Figure 3:
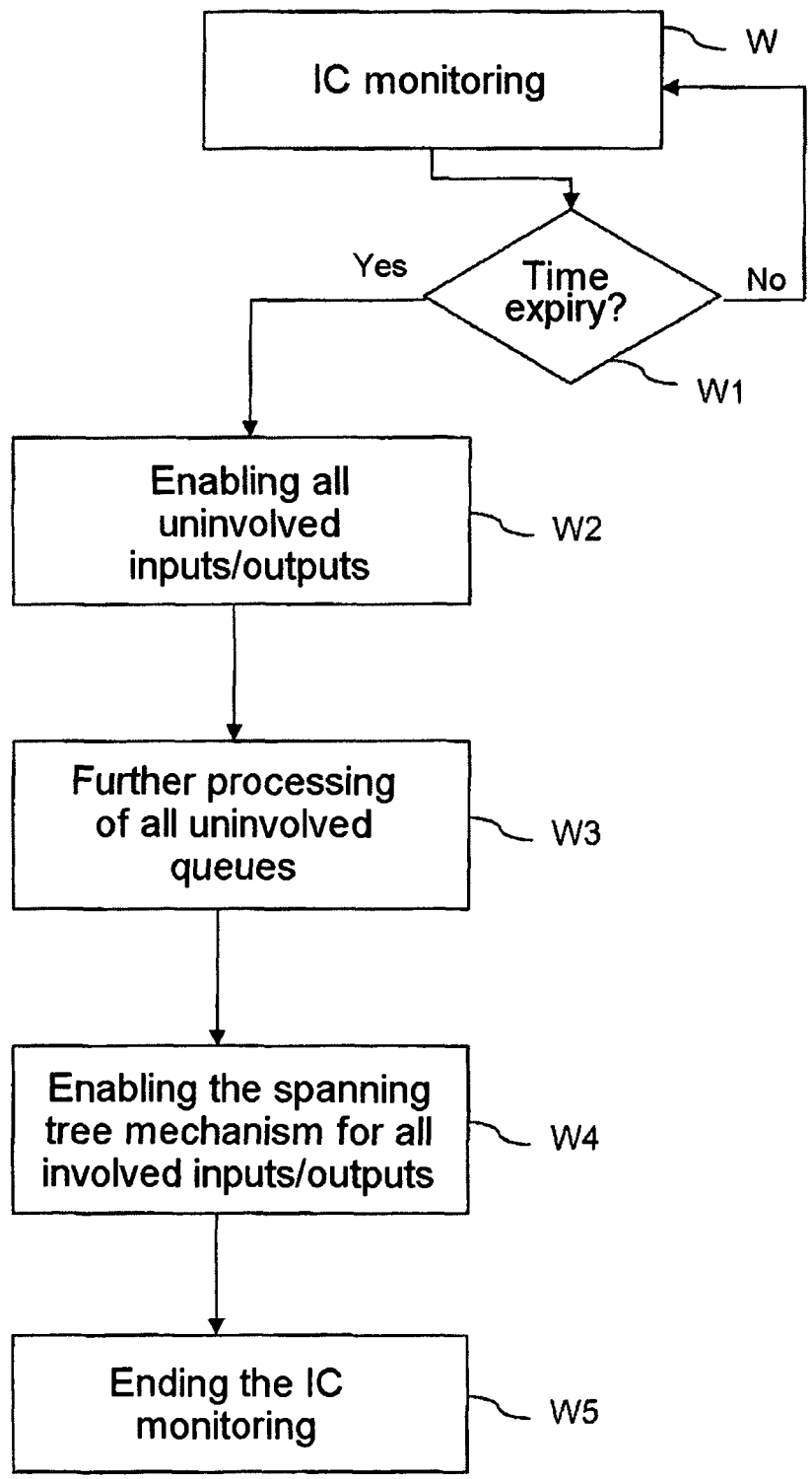
FIG. 3 shows a flowchart of the sequence of an IC watchdog process.

FIG. 3 shows a flowchart for the sequence of an IC watchdog process which comprises an inquiry step W1 in which the watchdog circuit checks whether timeout information is present. The counting process belonging to the watchdog process takes place in block W.

A positive result of the inquiry step W1 has the consequence that the transmission of the isochronous data stream has been ended (there is no triggering of the watchdog E3). For this reason, all deactivated ports are first switched on again (step W2).

Furthermore, all stopped queues are activated (step W3). In addition, the spanning tree mechanism (step W4) for the ports to which the additional traffic class is not assigned is switched on. After that, the IC watchdog is removed (step W5) after which the multi-port bridge is again in its original state.

FIG. 4 shows a table which documents the relationship between traffic types, the number of queues, and the user priorities with respect to one another.

The table has been modified on the basis of the traditional table known from the IEEE802.1D standard, accommodating an additional traffic class IC.

The abbreviations used in the table have the following significance, in detail:
BK=background, BE=best effort, EE=excellent effort, CL=controlled load, VI=video, VO=voice, NC=network control, IC=isochronous channel.

The table shows that the new traffic class IC prescribes only one queue. No other queues are required so that the queue management is as simple as efficient as possible.

The invention claimed is:

1. Method for operating a multi-port bridge for the routing of data packets, differentiated in accordance with traffic classes, wherein the definition of the traffic classes in the multi-port bridge is in accordance with the IEEE 802.1D standard, wherein in the method, an additional traffic class for isochronous data traffic received via a first port is introduced and in that the multi-port bridge is configured in such a manner that, for each transmission direction, at least one predetermined second port is operated in the "forwarding" state in which the at least one predetermined second port forwards data packets of the additional traffic class for isochronous data traffic from a queue and in that during the forwarding, all ports apart from the predetermined first and second ports are deactivated, wherein the method comprises:
 a first checking step that checks whether the additional traffic class for isochronous data traffic is assigned to the arriving traffic;
 the method being continued in the case of a positive result of the first checking step in a second checking step in which it is checked whether an isochronous data flow is active;
 the method being continued in accordance with the IEEE802.1D standard in the case of a negative result of the first checking step;
 the method is continued in the case of a positive result of the second checking step in a triggering step in which a watchdog circuit is triggered which, in operation, is used for informing a control unit that a data stream is currently active, the control unit regulating the forwarding of the traffic stream in the additional traffic class.

2. Method according to claim 1, wherein, in the case of a negative result of the second checking step, a subprocess comes into operation which comprises at least one of the following steps:
 a first deactivation step in which all ports are switched off with the exception of the predetermined first and second ports;
 a saving step in which the data packets of the queues allocated to the deactivated ports are saved until the respective ports are switched on again;
 a second deactivation step in which the first spanning tree mechanism for the predetermined first and second ports is deactivated;
 an installation step in which a watchdog circuit is installed, the value of which for the timeout time is selected to be of such magnitude that this watchdog circuit can be woken up at any time during the flowing of the data stream in the additional traffic class.

3. Method according to claim 1, wherein a number of isochronous data streams are defined to which a number of predetermined first and at least one second ports are assigned.

* * * * *